(12) United States Patent
Russo

(10) Patent No.: US 12,447,420 B2
(45) Date of Patent: Oct. 21, 2025

(54) SEDIMENT CAPTURE SYPHON APPARATUS

(71) Applicant: Richard Charles Russo, Abbeville, LA (US)

(72) Inventor: Richard Charles Russo, Abbeville, LA (US)

( * ) Notice: Subject to any disclaimer, the term of this patent is extended or adjusted under 35 U.S.C. 154(b) by 613 days.

(21) Appl. No.: 18/047,632

(22) Filed: Oct. 18, 2022

(65) Prior Publication Data

US 2023/0381688 A1 Nov. 30, 2023

Related U.S. Application Data

(60) Provisional application No. 63/473,381, filed on May 25, 2022.

(51) Int. Cl.
*B01D 21/00* (2006.01)
*F04B 17/03* (2006.01)
*F04B 23/02* (2006.01)
*F04F 10/00* (2006.01)

(52) U.S. Cl.
CPC .......... *B01D 21/0012* (2013.01); *F04B 17/03* (2013.01); *F04B 23/021* (2013.01); *F04F 10/00* (2013.01)

(58) Field of Classification Search
CPC ..... B01D 21/0012; F04F 10/00; F04B 23/021
See application file for complete search history.

(56) References Cited

U.S. PATENT DOCUMENTS 9,759,180 B2 9/2017 Russo
2020/0101401 A1 4/2020 Russo

*Primary Examiner* — Bradley R Spies
(74) *Attorney, Agent, or Firm* — Ingenium Patents LLC; Peter R Kramer

(57) ABSTRACT

A sediment capture syphon apparatus for capturing sediment from a borrow site is disclosed. The apparatus comprises a containment basin having a containment basin pump valve and a vacuum tank vacuum valve configured to pump water to a vacuum tank. The vacuum tank is connected to an anti-static pressure tank and a backwash tank via one or more valves and conduits. The containment basin is further connected to a separator tank configured to pull the sediment deposits from a submerged filter. A filter assembly is configured to deposit the sediment in the deposited location. The apparatus further includes a buoyancy lift configured to exert a buoyancy lift float mechanism to float deposit and a waterfall tank to receive water flow from the filter assembly by creating pressure. The apparatus is further connected to an electrical power source to power a battery comprising one or more switches via a wire.

16 Claims, 1 Drawing Sheet

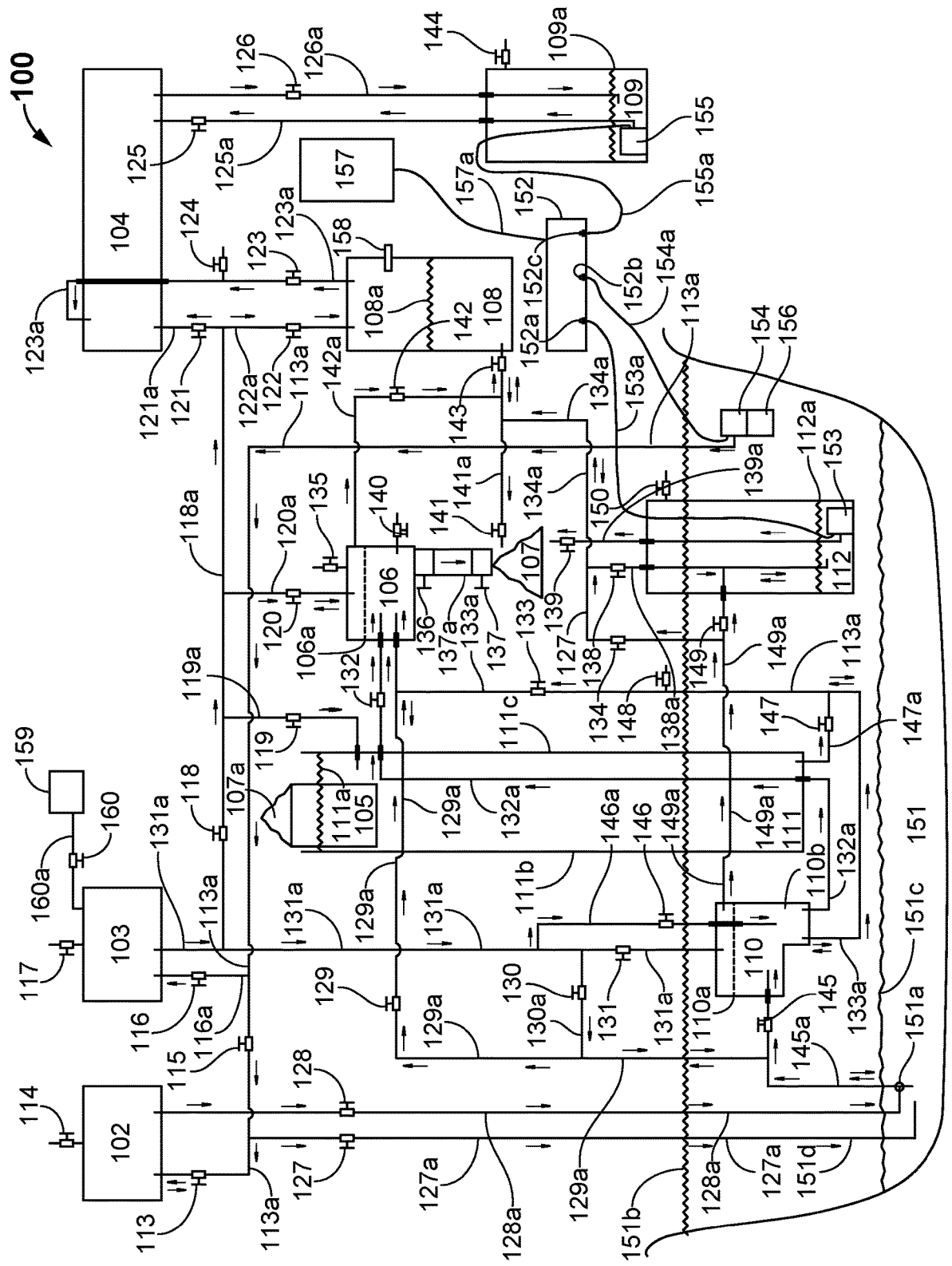

SEDIMENT CAPTURE SYPHON APPARATUS

CROSS REFERENCE TO RELATED APPLICATIONS

This application claims benefit of the filing date of U.S. Provisional Application No. 63/473,381, filed on 2022 May 25. The contents of U.S. Provisional Application No. 63/473,381 are hereby incorporated by reference.

TECHNICAL FIELD

The present invention generally relates to a sediment capture apparatus. More specifically, the present invention relates to a sediment capture apparatus to capture and borrow sediment from the bottom of rivers, bays, and other bodies of water.

BACKGROUND

Sedimentation is a natural process in all water bodies. The process of sedimentation includes the accumulation of sediments in rivers and streams. Most sediments settle at the bottom of the river or water bodies. The accumulated sediments have negative effects which decrease the water quality, loss of habitat, and pollutants in water. Various sedimentation-capturing apparatuses are used to remove sand and sediment from rivers, bays, creeks, and other bodies of water. The sediment capture apparatus is a useful measure for preserving water quality. Moreover, they are most useful in capturing sediments in the runoff.

Currently, sedimentation-based tanks and pumps are used for removing the majority of the sediments. The sedimentation-based tanks and pumps, however, cannot completely remove all of the fine sediment from the water. Therefore, in addition, sedimentation filter systems are used to remove fine sediment. The filtering system serves as a collector capturing all solid particles and debris. Moreover, filtration systems are used for the effective treatment of water.

The existing systems use sediment capture apparatuses comprising a syphon filter and pumps. They use gravity flow from the upper tank to generate a vacuum to establish a syphon for drawing flowable sediment slurry from an environmental borrow site to a filter. Further, other existing systems employ apparatuses for transporting water to elevation using multiple forces of nature simultaneously or separately.

Thus, there is a need for a sediment capture apparatus that captures and borrows sediment from the bottom of the borrow site and other bodies of water. Also, there is a need for an apparatus that is independent of the borrow site water surface. Further, there is a need for an apparatus that uses a vacuum to lift the sediment from the bottom of the borrow site.

SUMMARY

The present invention generally discloses a sediment capture apparatus. Further, the present invention discloses a sediment capture apparatus to capture and borrow sediment from the bottom of rivers, bays, and other bodies of water. The apparatus of the present invention uses a vacuum to lift the sediment from the bottom of the borrow site.

In one embodiment, the apparatus comprises a containment basin placed above a borrow site. In one embodiment, the borrow site comprises a water surface having sediment. In one embodiment, the containment basin comprises a containment basin pump valve configured to pump water to a vacuum tank through a conduit and a vacuum tank vacuum valve configured to pump back water through a conduit into the containment basin, thereby creating a vacuum in the vacuum tank. In one embodiment, the vacuum tank further is connected to an anti-static pressure tank and a backwash tank via one or more valves and conduits. In one embodiment, the anti-static pressure tank is further connected to the borrow site via a drill valve configured to pump the water from the anti-static pressure tank to a drill conduit outlet and sediment. In one embodiment, the anti-static pressure tank is further connected with an anti-static valve to receive water from the borrow site attached to a connector.

In one embodiment, the containment basin is further connected to a separator tank via one or more valves and conduits. In one embodiment, the separator tank is configured to pull the sediment deposits from a submerged filter comprising slurry using a vacuum. In one embodiment, the sediment deposits pulled into the separator tank are flushed out into a deposit location when the water flows through any one of the conduits to the separator tank. In one embodiment, the separator tank further includes a water level indicator to indicate the level of water in the separator tank.

In one embodiment, the apparatus further includes a filter assembly or upper filter with a filter screen. In one embodiment, the syphon process begins when the filter assembly is full. In one embodiment, the filter assembly comprises an upper knife valve and a lower knife valve configured to deposit the sediment in the deposited location. When the vacuum in the filter assembly is released, the sediment piles in a lower knife valve compartment leaving the water in the filter assembly. The sediment then falls through the lower knife valve to the deposit location. In one embodiment, the vacuum in the filter assembly is released through an upper filter vent valve. In one embodiment, the filter assembly further includes a capture valve configured to capture and drain the valve comprising water along with aquatic life without any harm.

In one embodiment, the apparatus further includes a buoyance lift. In one embodiment, the buoyance lift is configured to exert a buoyancy lift float mechanism to float a float comprising the deposit at the surface of the water. In one embodiment, the apparatus further includes a waterfall tank to receive water flow from the filter assembly by creating pressure. During the syphon process, the water will flow from the backwash tank to the waterfall tank.

In one embodiment, the apparatus further includes a precipitation catch configured to add water to the backwash tank as precipitation occurs. In one embodiment, the backwash tank receives water from the precipitation catch via one or more valves. In one embodiment, the apparatus further includes an electrical power source. In one embodiment, the electrical power source is a solar panel. In one embodiment, the solar panel is configured to power a battery comprising one or more switches via a wire. In one embodiment, each switch is connected to a pump. In one embodiment, the switches provide power to the pumps through wires.

The above summary contains simplifications, generalizations, and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 1 shows a schematic representation of a sediment capture syphon apparatus, according to one embodiment of the present invention.

DETAILED DESCRIPTION OF EXAMPLE EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Referring to FIG. 1, a schematic representation of a sediment capture syphon apparatus 100 is illustrated. In one embodiment, the apparatus 100 is designed for capturing sediment from the bottom of borrow site such as rivers, bays, and other bodies of water. In one embodiment, the apparatus 100 uses a vacuum to lift the sediment from the bottom of the borrow site. In one embodiment, the apparatus 100 further uses a submerged filter under the surface of the borrow site where the water flows from the submerged filter to a waterfall tank by using pressure.

In one embodiment, the apparatus 100 comprises a containment basin 109 with a water level 109a placed above a borrow site 151. In one embodiment, the borrow site 151 comprises a water surface 151b having sediment 151c. In one embodiment, the containment basin 109 uses a vacuum to lift the sediment 151c from the barrow site 151. The containment basin 109 is independent of the borrow site water surface 151b and is placed above or below the surface. In one embodiment, the containment basin 109 comprises a containment basin pump valve 125 and a vacuum tank vacuum valve 126. The containment basin pump 125 is configured to pump water to a vacuum tank 104 through a conduit. The vacuum tank vacuum valve 126 is configured to pump back the water through the conduit into the containment basin 109, thereby creating a vacuum in the vacuum tank 104.

In one embodiment, the vacuum tank 104 is connected to an anti-static pressure tank 102 and a backwash tank 103 via one or more valves and conduits. In one embodiment, the anti-static pressure tank 102 is connected to the borrow site 151 via a drill valve 127 configured to pump the water from the anti-static pressure tank 102 to a drill conduit outlet 151d and sediment 151c. In one embodiment, the anti-static pressure tank 102 is connected to an anti-static valve 128 to receive water from the borrow site 151 attached with a connector 151a.

In one embodiment, the containment basin 109 is connected to a separator tank 108 with a water level 108a via one or more valves and conduits. In one embodiment, the separator tank 108 is configured to pull the sediment deposits from a submerged filter 110 with slurry using a vacuum. In one embodiment, the sediment deposits pulled into the separator tank 108 are flushed out into a deposit location 107 when the water flows through any one of the conduits to the separator tank 108. In one embodiment, the separator tank 108 comprises a water level indicator 158 to indicate the level of water in the separator tank 108.

In one embodiment, the apparatus 100 further comprises a filter assembly or upper filter 106 with an upper filter screen 106a. In one embodiment, the syphon process begins when the filter assembly 106 is full. In one embodiment, the filter assembly 106 comprises an upper knife valve 136 and a lower knife valve 137 configured to deposit the sediment in the deposited location 107. When the vacuum in the filter assembly 106 is released, the sediment piles in a lower knife valve compartment 137a leaves the water in the filter assembly 106. The sediment then falls through the lower knife valve 137 to the deposit location 107. In one embodiment, the vacuum in the filter assembly 106 is released through an upper filter vent valve 135. In one embodiment, the filter assembly 106 further comprises a capture valve 140 configured to capture and drain the valve having water along with aquatic life without any harm.

In one embodiment, the apparatus 100 further comprises a buoyancy lift 111. In one embodiment, the buoyancy lift 111 is configured to exert a buoyancy lift float mechanism to float a float 105 with deposit at the surface of the water. In one embodiment, the buoyancy lift 111 further lifts and lowers the deposit from the borrow site 151 as the water level rises and falls.

In one embodiment, the apparatus 100 further comprises a waterfall tank 112 with a water level 112a. In one embodiment, the waterfall tank 112 receives water flow from the filter assembly 106 by creating pressure. During the syphon process, the water flows from the backwash tank 103 to the waterfall tank 112. The waterfall tank 112 holds a sufficient amount of water to flow to the other valves and conduits.

In one embodiment, the apparatus 100 further comprises a precipitation catch 159 configured to add water to the backwash tank 103 when precipitation occurs. It is a way for other water to be introduced into the apparatus 100 along with water from other forces that elevate water. In one embodiment, the backwash tank 103 receives water from the precipitation catch 159 via one or more valves. In one embodiment, the precipitation catch 159 comprises a conduit attached to any one of the valves configured to allow the water to flow into the backwash tank 103 via the conduit.

In one embodiment, the apparatus 100 further comprises an electrical power source. In one embodiment, the electrical power source is a solar panel 157. In one embodiment, the solar panel 157 is configured to power at least one battery 152. The solar panel 157 supplies power to the battery 152 via one or more wires 147a. The battery 152 is operated using one or more switches. In one embodiment, one or more switches may include, but are not limited to, a waterfall pump switch 152a, a borrow site pump switch 152b, and a containment basin power switch 152c. In one embodiment, each switch is connected to a pump. In one embodiment, the switches are configured to supply power to the pumps through wires. In one embodiment, the waterfall pump switch 152a is configured to power a waterfall pump 153 of the waterfall tank 112 via a waterfall pump wire 153a. In one embodiment, the borrow site pump switch 152b is configured to power a borrow site pump 154 of the barrow site 151 via a borrow site pump wire 154a. In one embodiment, the borrow site pump 154 further includes a borrow site pump filter 156 configured to filter the water before it is pumped by the borrow site pump 154. In one embodiment, the containment basin power switch 152c is configured to power a containment basin pump 155 of the containment basin 109 via a containment basin pump wire 155a.

Operational Procedures

Starting the Apparatus

In one embodiment, the syphon mechanism for capturing the sediment from the borrow site 151 using the apparatus 100 includes the following operations. At step 1, all valves and pumps in the apparatus 100 are turned off. In one embodiment, the battery 152 attached to the electrical power source is powered. Further, the battery 152 comprising one or more switches, provides power to the pumps through wires (155a, 154a, and 155a). At step 2, all the valves are in open position. In one embodiment, the valves may include, but are not limited to, an anti-static filler valve 113, an anti-static tank vent valve 114, a driller backflow valve 115, a backwash tank filler valve 116, a backwash tank vent valve 117, a vacuum block valve 118, a vacuum tank filler valve 121, a vacuum tank vent valve 124, and a containment basin vent valve 144. The open position of valves allows the water in the parts to flow freely without creating an airlock.

At step 3, the borrow site pump switch 152b is turned on, and the water filter by the borrow site pump filter 156 is filled in the anti-static pressure tank 102, backwash tank 103, and vacuum tank 104. While the borrow site pump switch 152 b is on, the water flows from below the water surface 151b in borrow site 151 through the borrow site pump filter 156, the barrow site pump 154, an anti-static filler conduit 113a, a driller backflow valve 115, anti-static filler valve 113 into the anti-static pressure tank 102. Further, the water flows from a backwash tank conduit 116a, backwash tank filler valve 116 into the backwash tank 103. The water then flows from the part of a submerged filter backwash conduit 131a, a vacuum block conduit 118a, vacuum block valve 118, a vacuum tank filler conduit 121a, vacuum tank filler valve 121, and into the vacuum tank 104. In one embodiment, the tanks (102, 103, and 104) are filled with water. The tanks (102, 103, and 104) are full when the water flows out of the tank vents. In one embodiment, the water is filtered by the borrow site pump filter 156 before it is pumped by the borrow site pump 154. The part of the conduit means up to the valve that is closed.

At step 4, the valves such as driller backflow valve 115, backwash tank filler valve 116, vacuum block valve 118, vacuum tank filler valve 121, and vacuum tank vent valve 124 are closed and the barrow site pump switch 152b is turned off. The water stops flowing into the tanks (102, 103, and 104) and will not flow back to borrow site pump 154. At step 5, the valves including anti-static valve 128, a submerged filter valve 145, a waterfall backflow valve 149, and a waterfall pump valve 139 are open. The waterfall pump switch 152a and waterfall pump 153 are on. While the waterfall pump switch 152a is on the water in the anti-static pressure tank 102 flows through an anti-static conduit 128a, anti-static valve 128, connector 151a, a submerged filter conduit 145a, submerged filter valve 145, submerged filter 110, a submerged filter screen 110a, a waterfall backflow conduit 149a, waterfall backflow valve 149, a waterfall tank conduit or part of conduit 138a, and down into the waterfall tank 112, and flows through the waterfall pump 153, a waterfall pump conduit 139a, waterfall pump valve 139, and to the deposit location 107.

At step 6, the driller valve 127 is open and the anti-static valve 128 is closed where a sediment pile is in the submerged filter 110 and slurry compartment 110b. While the anti-static filler valve 113 is open, a flow is established in connector 151a when the anti-static valve 128 is open. When the driller valve 127 is open and the anti-static valve 128 is closed, the water flows through a driller conduit 127a and driller conduit outlet 151d into sediment 151c. A slurry of sediment flows into the end of the submerged filter conduit 145a through connector 151a, submerged filter valve 145, submerged filter 110 and settles into a pile on the bottom of the submerged filter 110 and slurry compartment 110b. The connector 151a which is near the end of the submerged filter conduit 145a allows the water from the anti-static conduit 128a to flow into the submerged filter conduit 145a. When the ant-static valve 128 is closed, the vacuum in the submerged filter conduit 145a pulls the slurry of sediment into the end of submerged filter conduit 145a which is open to borrow site 151.

At step 7, the valves such as driller valve 127, waterfall pump valve 139, submerged filter valve 145, and waterfall backflow valve 149 are closed. Further, the waterfall pump switch 152a and waterfall pump 153 are off to pump water to deposit location 107. In one embodiment, the waterfall pump 153 pumps water out of the waterfall tank 112 through the waterfall pump conduit 139a, waterfall pump valve 139, and to the deposit location 107. The waterfall pump switch 152a is turned off when waterfall pump 153 runs out of water.

Processing Sediment in the Submerged Filter

At step 1, one or more valves including a separator tank vacuum valve 123, vacuum tank vacuum valve 126, slurry backflow valve 133, right vacuum flow valve 142, and separator tank valve 143 are open. While the vacuum tank filler valve 121 and vacuum tank vent valve 124 are closed, the water in vacuum tank 104 flows through the vacuum tank vacuum conduit 126a, vacuum tank vacuum valve 126, and into the containment basin 109. This will create a vacuum in the vacuum tank 104, a part of containment basin pump conduit 125a, and part of vacuum tank filler conduit 121a, a separator tank vacuum conduit 123a, separator tank vacuum valve 123, separator tank 108, a part of separator tank backwash conduit 122a, separator tank valve 143, a deposit location conduit 141a, a part of backflow valve conduit 134a, part of waterfall tank conduit 138a, a right vacuum flow conduit 142a, right vacuum flow valve 142, filter assembly 106, a part of left vacuum flow conduit 129a, part of buoyancy lift flow conduit 132a, an apart of upper filter backwash conduit 120a, a slurry backflow valve conduit 133a, slurry backflow valve 133, slurry compartment 110b, part of buoyancy lift flow conduit 132a, a part of slurry compartment conduit 146a, submerged filter 110, part of submerged filter conduit 145a, part of submerged filter backwash conduit 131a, and part of waterfall backflow conduit 149a.

At step 2, a slurry compartment valve 146 is open. The water in backwash tank 103 flows through the submerged filter conduit 131a, slurry compartment conduit 146a, and slurry compartment valve 146 into the submerged filter 110 and compartment 110b. This will create a slurry of sediment in the pile on the bottom of the submerged filter 110 and in the slurry compartment 110b. The vacuum pulls the slurry through slurry backflow valve conduit 133a, slurry backflow valve 133, left vacuum flow conduit 129a, filter assembly 106, and water through filter assembly screen 106a, right vacuum flow conduit 142a, right vacuum flow valve 142, deposit location conduit 141a, separator tank valve 143, and into the separator tank 108. When the slurry is in filter assembly 106, sediment 151c settles into a pile on the bottom of filter assembly 106. The water in the separator tank 108 rises to level 108a shown by indicator 158. As this continues the slurry in slurry compartment 110b is moved to filter assembly 106. The separator tank 108 keeps water from being vacuumed into the vacuum tank 104.

At step 3, the valves such as the slurry backflow valve 133, right vacuum flow valve 142, separator tank valve 143, and slurry compartment valve 146 are closed. Further, the upper filter vent valve 135 and upper knife valve 136 are open. The vacuum in filter assembly 106 is released through upper filter vent valve 135, and the sediment pile will fall through the upper knife valve 136 into the lower knife valve compartment 137a leaving the water in filter assembly 106. The air in the lower knife valve compartment 137a flows up to the top of filter assembly 106. At step 4, the upper knife valve 136 is closed and the lower knife valve 137 is open. Further, deposit location 107 has sediment. While the lower knife valve 137 is open, the sediment falls through the lower knife valve 137 to the deposit location 107. The lower knife valve compartment 137a also allows the sediment pile to be removed from filter assembly 106 while the vacuum is still in filter assembly 106 and the slurry still flowing. When the upper knife valve 136 is closed, it holds the vacuum in filter assembly 106 while lower knife valve 137 is open.

At step 5, the vacuum tank vent valve 124 and containment basin pump valve 125 are open. The containment basin pump switch 152c and containment basin pump 155 are on to fill the vacuum tank 104. While vacuum tank vent valve 124 and containment basin pump valve 125 are open, the water in the containment basin 109 flows from the containment basin pump 155 through containment basin pump conduit 125a, containment basin pump valve 125, and into the vacuum tank 104. This will refill the vacuum tank 104. At step 6, the containment basin pump valve 125 is closed. Further, the containment basin pump switch 152c and containment basin pump 155 are off. While the containment basin pump valve 125 is closed the water stop flowing into the vacuum tank 104.

Drain and Backwash

At step 1, the left vacuum flow valve 129 and capture valve 140 are open to drain the filter assembly 106 and the aquatic life is safe. This allows the water in filter assembly 106 to flow out through a left vacuum flow conduit 129a and left vacuum flow valve 129. Also, this allows the aquatic life to escape by following the water flow and return to the borrow site 151 without harm, and through capture valve 140 for capture without harm. Further, the filter assembly screens 106a and submerged filter screen 110a keep the aquatic life in filter assembly 106 and submerged filter 110 until they are allowed to escape. At step 2, the backwash tank filler valve 116 is open, and the borrow site pump switch 152b and borrow site pump 154 are on. While the borrow site pump switch 152b is on, the water flows through borrow site pump filter 156, borrow site pump 154, part of anti-static filter conduit 113a, backwash tank conduit 116a, and backwash tank filler valve 116 into the backwash tank 103. This will add water to the backwash tank 103.

At step 3, the left vacuum flow valve 129 and capture valve 140 are closed. Further, the vacuum block valve 118, an upper filter backwash valve 120, and upper knife valve 136 are open. While the lower knife valve 137 is still open, water flows from the backwash tank 103 through part of submerged filter backwash conduit 131a, part of vacuum block conduit 118a, vacuum block valve 118, upper filter backwash conduit 120a, upper filter backwash valve 120, upper filter screen 106a, the filter assembly 106 and upper knife valve 136. Anything left in filter assembly 106 and lower knife valve compartment 137a is flushed out. At step 4, the upper filter backwash valve 120, upper filter vent valve 135, upper knife valve 136, and lower knife valve 137 are closed. Further, a separator tank backwash valve 122, separator tank valve 143, and a deposit location valve 141 are open. While the borrow site pump switch 152b is on, the water flows through borrow site pump filter 156, borrow site pump 154, part of anti-static filler conduit 113a, backwash tank conduit 116a, backwash tank valve 116, backwash tank 103, part of submerged filter backwash conduit 131a, vacuum block conduit 118a, vacuum block valve 118, separator tank backwash conduit 122a, separator tank backwash valve 122, separator tank 108, separator tank valve 143, deposit location conduit 141a, deposit location valve 141, and to deposit location 107. The fine particle sediment that settled in separator tank 108 is flushed out to deposit location 107.

At step 5, the vacuum block valve 118 is closed and a connector backwash valve 130 is open. While the borrow site pump switch 152b is on, water flows through the borrow site pump filter 156, borrow site pump 154, part of anti-static filler conduit 113a, backwash tank conduit 116a, backwash tank valve 116, backwash tank 103, part of submerged filter backwash conduit 131a, a connector backwash conduit 130a, connector backwash valve 130, part of left vacuum flow conduit 129a, part of submerged filter conduit 145a, and connector 151a into borrow site 151. This will flush out connector 151a and the end of submerged filter conduit 145a when sediment in borrow site 151 is compressed in and around the end of the submerged filter conduit 145a. At step 6, the backwash tank filler valve 116 is closed, and the borrow site pump switch 152b and borrow site pump 154 are off. While the backwash tank filler valve 116 is closed, the water stops flowing.

Bypass Submerged Filter

At step 1, all the valves and pumps are turned off. At step 2, the anti-static filler valve 113, anti-static tank vent valve 114, driller backflow valve 115, backwash tank filler valve 116, backwash tank vent valve 117, vacuum block valve 118, vacuum tank filler valve 121, vacuum tank vent valve 124, and containment basin vent valve 144 are open. This allows water in the parts to flow freely without creating an airlock. At step 3, the borrow site pump switch 152b and borrow site pump 154 are on. While borrow site pump switch 151b is on, the water flows through borrow site pump filter 156, borrow site pump 154, anti-static filler conduit 113a, driller backflow valve 115, anti-static filler valve 113 into the anti-static tank 102. Further, the water flows through the backwash tank conduit 116a, and backwash tank valve 116 into backwash tank 103. Further, the water flows through the part of submerged filter backwash conduit 131a, vacuum block conduit 118a, vacuum block valve 118, vacuum block filler conduit 121a, vacuum tank filler valve 121, and into vacuum tank 104. The water filtered by borrow site pump filter 156 is filled with water in anti-static pressure tank 102, backwash tank 103, and vacuum tank 104.

At step 4, the driller backflow valve 115, backwash tank filler valve 116, vacuum block valve 118, vacuum tank filler valve 121, and vacuum tank vent valve 124 are closed. And, the separator tank vacuum valve 123, vacuum tank vacuum valve 124, right vacuum flow valve 142, and separator tank valve 143 are open. The water in the vacuum tank 104 flows through vacuum tank vacuum valve 126 and a vacuum tank vacuum conduit 126a into the containment basin 109. This will create a vacuum in vacuum tank 104, part of containment basin pump conduit 125a, part of vacuum tank filler conduit 121a, separator tank vacuum conduit 123a, separator tank vacuum valve 123, separator tank 108, part of separator tank backwash conduit 122a, separator tank valve 143, deposit location conduit 141a, part of backflow valve conduit 134a, part of waterfall tank conduit 138a, right vacuum flow conduit 142a, right vacuum flow valve 142, filter assembly 106, part of left vacuum flow conduit 129a, part of slurry backflow flow conduit 133a, part of buoyancy lift flow conduit 132a, and part of upper filter backwash conduit 120a.

At step 5, the anti-static valve 128 and left vacuum flow valve 129 are open. This allows water in the anti-static tank 102 to flow through anti-static conduit 128a, anti-static valve 128, connector 151a, part of submerged filter conduit 145a, left vacuum flow conduit 129a, left vacuum flow valve 28, the filter assembly 106, filter assembly screen 106a, right vacuum flow conduit 142a, right vacuum flow valve 142, part of deposit location conduit 141a, separator tank valve 143, and into separator tank 108. At step 6, the driller valve 127 is open and the anti-static valve 128 is closed where the sediment is piled on the bottom of the upper filter assembly 106. A flow is established in connector 151a when anti-static valve 128 is open. When driller valve 127 is open and anti-static valve 128 is closed, the slurry of sediment flows into filter assembly 106 and settles into a pile on the bottom of filter assembly 106. At step 7, the driller valve 127 and left vacuum flow valve 129 are closed. Closing vacuum flow valve 129 stops the flow of sediment into filter assembly 106.

Bypass Waterfall Tank

At step 1, close all valves and turn off all pumps. At step 2, the anti-static filler valve 113, anti-static tank vent valve 114, driller backflow valve 115, backwash tank filler valve 116, backwash tank vent valve 117, vacuum block valve 118, vacuum tank filler valve 121, vacuum tank vent valve 124, and containment basin vent valve 144 are open. This allows water in the parts to flow freely without creating an airlock. At step 3, the borrow site pump switch 152b and borrow site pump 154 are on. While borrow site pump switch 152b is on, the water flows through borrow site pump filter 156, borrow site pump 154, anti-static filler conduit 113a, driller backflow valve 115, anti-static filler valve 113 into the anti-static pressure tank 102. Further, the water flows into the backwash tank conduit 116a, backwash tank filler valve 116 into backwash tank 103. Further, the water flows into the part of submerged filter backwash conduit 131a, vacuum block conduit 118a, vacuum block valve 118, vacuum tank filler conduit 121a, vacuum tank filler valve 121, and into vacuum tank 104. Water filtered by borrow site pump filter 55 is in anti-static pressure tank 102, backwash tank 103, and vacuum tank 104.

At step 4, close valves driller backflow valve 115, backwash tank filler valve 116, vacuum block valve 118, vacuum tank filler valve 121, and vacuum tank vent valve 124. Open valves separator tank vacuum valve 123, vacuum tank vacuum valve 126, backflow valve 134, separator tank valve 143, and submerged filter valve 145. Water in the vacuum tank 104 flows through vacuum tank vacuum valve 126 and vacuum tank vacuum conduit 126a into containment basin 109. This will create a vacuum in the vacuum tank 104, part of containment basin pump conduit 125a, part of vacuum tank filler conduit 121a, separator tank vacuum conduit 123a, separator tank vacuum valve 123, separator tank 108, part of separator tank backwash conduit 122a, separator tank valve 143, deposit location conduit 141a, part of right vacuum flow conduit 142a, backflow valve conduit 134a, part of waterfall tank conduit 138a, backflow valve 134, part of waterfall backflow conduit 149a, submerged filter 110, slurry compartment 110b, part of slurry compartment filter conduit 146a, part of buoyancy lift flow conduit 132a, part of slurry backflow valve conduit 133a, part of submerged filter backwash conduit 131a, submerged filter conduit 145a, submerged filter valve 145 and part of left vacuum flow conduit 129a.

At step 5, the anti-static valve 128 is open. This allows water in the anti-static tank 102 to flow through anti-static conduit 128a, anti-static valve 128, connector 151a, submerged filter conduit 145a, submerged filter valve 145, submerged filter 110, submerged filter screen 110a, part of waterfall backflow conduit 149a, backflow valve conduit 134a, backflow valve 134, deposit location conduit 141a, separator tank valve 143, and into the separator tank 108. At step 6, the anti-static filler valve 113 and driller valve 127 are open. Further, the anti-static valve 128 is closed. A flow is established in connector 151a when anti-static valve 128 is open. When driller valve 127 is open and anti-static valve 128 is closed, a slurry of sediment will flow into the end of submerged filter conduit 145a, through connector 151a, submerged filter valve 145, submerged filter 110 and settle into a pile on the bottom of the submerged filter 110 and slurry compartment 110b. The connector 151a which is near the end of conduit 44a allows water from conduit 27a to flow into submerged filter conduit 145a. When anti-static valve 128 is closed, the vacuum in submerged filter conduit 145a pulls the slurry of sediment into the end of submerged filter conduit 145a which is open to borrow site 151. At step 7, driller valve 127 and submerged filter valve 145 are closed. Closing Submerged Filter Valve 145 will stop the flow of sediment into the submerged filter 110.

Starting a Syphon

At step 1, close all valves and turn off all pumps. At step 2, the anti-static filler valve 113, anti-static tank vent valve 114, driller backflow valve 115, backwash tank filler valve 116, backwash tank vent valve 117, vacuum block valve 118, vacuum tank filler valve 121, vacuum tank vent valve 124, and containment basin vent valve 144 are open. This allows water in the parts to flow freely without creating an airlock. At step 3, the borrow site pump switch 152b and borrow site pump 154 are on. While borrow site pump switch 152b is on, the water will flow through borrow site pump filter 156, borrow site pump 154, anti-static filler conduit 113a, driller backflow valve 115, anti-static filler valve 113, into the anti-static tank 102. Further, the water flows through the backwash tank conduit 116a, backwash tank filler valve 116, into the backwash tank 103. Further, the water flows through the part of submerged filter backwash conduit 131a, vacuum block conduit 118a, vacuum block valve 118, vacuum tank filler conduit 121a, vacuum tank filler valve 121, and into the vacuum tank 104. The tanks (102, 103, and 104) are filled with water.

At step 4, a submerged filter backwash valve 131, waterfall backflow valve 149, and waterfall tank vent valve 150 are open. Further, the anti-static filler valve 113 and vacuum tank filler valve 121 are closed. The water will flow from the backwash tank 103 through submerged filter backwash conduit 131a, submerged filter backwash valve 131, submerged filter screen 110, submerged filter 110, waterfall backflow conduit 149a, waterfall backflow valve 149, part of waterfall tank conduit 138a, and into the bottom of waterfall tank 112. This will provide sufficient water in tank 112 to fill waterfall tank conduit 138a, waterfall tank valve 138, and part of slurry backflow valve conduit 133a, deposit location conduit 141a, right vacuum flow conduit 142a, right vacuum flow valve 142, filter assembly 106, part of left vacuum flow conduit 129a, part of slurry backflow valve conduit 133a, part of buoyancy lift flow conduit 132a and part of upper filter backwash conduit 120a. At step 5, the vacuum tank vent valve 124 is closed. Further, the separator tank vacuum valve 123, vacuum tank vacuum valve 126, right vacuum flow valve 142, and separator tank valve 143 are open. The water in vacuum tank 104 will flow through vacuum tank vacuum valve 126 and vacuum tank vacuum conduit 126a into the containment basin 109. This will create a vacuum in the vacuum tank 104, part of containment basin pump conduit 125a, part of vacuum tank filler conduit 121a, separator tank vacuum conduit 123a, separator tank vacuum valve 123, separator tank 108, part of separator tank backwash conduit 122a, separator tank valve 143, deposit location conduit 141a, part of slurry backflow valve conduit 134a, waterfall tank conduit 138a, a waterfall tank valve 138, part of waterfall backflow conduit 149a, right vacuum flow conduit 142a, right vacuum flow valve 142, filter assembly 106, part of left vacuum flow conduit 129a, part of slurry backflow valve conduit 133a, part of buoyancy lift flow conduit 132a and part of upper filter backwash conduit 120a.

At step 6, the upper filter backwash valve 120, separator tank backwash valve 122, left vacuum flow valve 129, and waterfall pump valve 139 are open. Further, the separator tank valve 143 is closed. The vacuum in conduits 120a, 118a, and 122a will lift water from the end of conduit 44a and waterfall tank 112, and fill part of submerged filter conduit 145a, connector 151a, left vacuum flow conduit 129a, left vacuum flow valve 129, the filter assembly 106, part of buoyancy lift flow conduit 132a, right vacuum flow conduit 142a, right vacuum flow valve 142, part of deposit location conduit 141a, part of backflow valve conduit 134a, waterfall tank conduit 138a and waterfall tank valve 138. Closing then opening left vacuum flow valve 129 and right vacuum flow valve 142 in a timely manner will lift the water to filter assembly 106 evenly. A syphon will start when filter assembly 106 is full; syphon water will flow from the end of submerged filter conduit 145a through the conduits and filter assembly 106 into waterfall tank 112 when water is available at the end of submerged filter conduit 145a.

At step 7, the waterfall pump switch 152a and waterfall pump 153 are on. This allows the water to flow from waterfall pump 153 through waterfall pump conduit 139a and waterfall pump valve 139 to deposit location 107. At step 8, the upper filter backwash valve 120 is closed and opened. Small amounts of air in the sediment are released and collected at the top of filter assembly 106 in this process. If excessive air collects in filter assembly 106, the syphon will stop. It is necessary to maintain the vacuum to remove the air. The air at the top of filter assembly 106 is removed when the upper filter backwash valve 120 is open. The vacuum provided to filter assembly 106 is stopped when the upper filter backwash valve 120 is closed. At step 9, the upper filter vent valve 135 is open. This will stop the syphon. The air will flow through upper filter vent valve 135 into filter assembly 106 and drain the conduits of the water.

Buoyancy Lift

At step 1, close all valves and turn off all pumps. At step 2, the backwash tank filler valve 116, vacuum block valve 118, a buoyancy lift filler valve 119 are open. Further, the borrow site pump switch 152b and borrow site pump 154 are on. The water flows through borrow site pump filter 156, borrow site pump 154, part of anti-static filler conduit 113a, backwash tank conduit 116a, backwash tank filler valve 116, the backwash tank 103, part of submerged filter backwash conduit 131a, part of vacuum block conduit 118a, vacuum block valve 118, a buoyancy lift filler conduit 119a, and buoyancy lift filler valve 119 into buoyancy lift 111.

At step 3, a buoyancy lift flow valve 132, deposit location valve 141, right vacuum flow valve 142, and a buoyancy lift pressure valve 147 are open. The water in buoyancy lift 111 flows through buoyancy lift pressure conduit 147a, buoyancy lift pressure valve 147, part of slurry backflow valve conduit 133a, slurry compartment 110b, buoyancy lift flow conduit 132a, buoyancy lift flow valve 132, the filter assembly 106, upper filter assembly screen 106a, right vacuum flow conduit 142a, right vacuum flow valve 142, part of deposit location conduit 141a, deposit location valve 141 and to deposit location 107. The water level 111a in buoyancy lift 111 is maintained sufficiently above the top of filter assembly 106 to provide adequate flow. At step 4, the borrow site pump switch 152b and borrow site pump 154 are off. The buoyancy lift filler valve 119 and buoyancy lift flow valve 132 are closed where the water stops flowing. The buoyancy lift 111 also assists the vacuum which is created in vacuum tank 104 to move the sediment from compartment 110b below, up into filter assembly 106 above. The elevation height of the water to filter assembly 106 is determined by the height of the buoyancy lift 111. The buoyancy lift 111 lifts water to filter assembly 106 independent of the vacuum, a vacuum is not required for the buoyancy lift 111 to function. It uses the downward water pressure that is created at the surface of level 111a to function.

At step 5, a buoyancy lift drain valve 148 is open. The water in buoyancy lift will flow through buoyancy lift pressure conduit 147a, buoyancy lift pressure valve 147, part of slurry backflow valve conduit 133a, and buoyancy lift drain valve 148 into a disperse area or to deposit location 107. This will drain the water in buoyancy lift 111, and lowers the water level 111a.

Buoyancy Lift Float

At one step, the deposit 107a is placed on float 105. At this step, float 105 follows the sides 111b and 11c of buoyancy lift 111 while it floats on the surface of the water in buoyancy lift 111. As the water level 11a rises and falls, it lifts and lowers deposit 107a or other items. The deposit 107a is sediment from the borrow site 151.

Precipitation Catch

At step 1, the backwash tank vent valve 117 and a precipitation catch valve 160 are open. The precipitation catch 159 will add water to the backwash tank 103 as precipitation occurs. It is a way for other water to be introduced into the apparatus along with water from other forces that elevate water. When backwash tank vent valve 16 and precipitation catch valve 59 are open, the water from the perception catch 159 will flow through a precipitation catch conduit 160a, precipitation catch valve 59, and into the backwash tank 103. It is independent of the apparatus functions and does not require the apparatus system to be functioning.

Further, the apparatus 100 includes a bulkhead where the water falls to create the vacuum. The bulkhead is designed using the pilings that are installed along the bank of a body of water, which are hollow like a casing. In one embodiment, the bulkhead is surrounded by an open body of water and encloses it like a coffer dam, then pumped out with the system. The bulkhead is also a solar farm that powers the grid. Also, the solar panel that powers the pump at the bottom of the casing is placed on top of the casing for the structure.

Advantageously, the apparatus of the present invention recovers the land lost to erosion while the sediment builds new land. Also, the apparatus lifting the sediment above the tidal waters increases the ocean capacity and gives the arctic waters a place to go without raising the ocean.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A sediment capture syphon apparatus for capturing sediment from a borrow site, comprising:
    a containment basin comprising a containment basin pump valve and a vacuum tank vacuum valve, wherein the containment basin pump valve is configured to pump water to a vacuum tank through a conduit and the vacuum tank vacuum valve is configured to pump back water through a conduit into the containment basin, thereby creating a vacuum in the vacuum tank;
    an anti-static pressure tank and a backwash tank connected with the containment basin via one or more valves and conduits;
    a separator tank connected with the containment basin configured to pull the sediment deposits from a submerged filter comprising slurry using vacuum, wherein the submerged filter is placed on the borrow site for filtering the flow of sediment;
    a filter assembly or upper filter with a filter screen configured to deposit the sediment in the deposited location using one or more knife valves, wherein the filter assembly is connected to the separator tank via one or more conduits and valves;
    a buoyancy lift configured to exert a buoyancy lift float mechanism to float a float comprising the deposit at the surface of the water, wherein the buoyancy lift assists the submerged filter with sediment to move to the filter assembly using vacuum; and
    a waterfall tank with a water level configured to receive water flow from the filter assembly by creating a pressure;
        wherein the containment basin, waterfall tank, and barrow site are connected to an electrical power source configured to power a battery comprising one or more switches via a wire.

2. The apparatus of claim 1, wherein the containment basin is placed above the surface of the borrow site.

3. The apparatus of claim 1, wherein the containment basin uses a vacuum to lift the sediment from the barrow site.

4. The apparatus of claim 1, wherein the anti-static pressure tank is connected to the borrow site via a drill valve configured to pump the water from the anti-static pressure tank to a drill conduit outlet and sediment.

5. The apparatus of claim 1, wherein the anti-static pressure tank is further connected to an anti-static valve to receive water from the borrow site attached to a connector.

6. The apparatus of claim 1, wherein the separator tank comprises a water level indicator to indicate the level of water.

7. The apparatus of claim 1, wherein the filter assembly allows the flow of water to the waterfall tank by pressure.

8. The apparatus of claim 1, wherein one or more knife valves includes an upper knife valve and a lower knife valve configured to deposit the sediment in the deposited location when the vacuum is released.

9. The apparatus of claim 1, wherein the buoyancy lift lifts and lowers the deposit from the borrow site as the water level rises and falls.

10. The apparatus of claim 1, wherein the electrical power source is a solar panel.

11. The apparatus of claim 1, wherein one or more switches include a waterfall pump switch, a borrow site pump switch, and a containment basin power switch configured to provide power to pumps via wires.

12. The apparatus of claim 1, further comprises a perception catch attached to the backwash tank configured to add water as perception occurs.

13. The apparatus of claim 1, further comprises a capture valve configured to capture and drain the valve comprising water along with aquatic lives without any harm.

14. The apparatus of claim 1, further comprises a bulkhead where the water falls to create the vacuum.

15. The apparatus of claim 14, wherein the bulkhead uses pilings to install along an open body of water forming a casing.

16. The apparatus of claim 14, wherein the bulkhead is using the pilings that are installed along used as a solar farm that powers the grid.

* * * * *